United States Patent [19]
Philipov et al.

[11] Patent Number: 5,355,982
[45] Date of Patent: Oct. 18, 1994

[54] STARTER DRIVE FOR INTERNAL COMBUSTION ENGINES

[76] Inventors: Dimitar B. Philipov, K.Drushba, Bl.42-A, Sofia, Bulgaria, 1592; Valeri D. Baronov, K.Mladost 1-A,Bl.514-4, Sofia, Bulgaria, 1787; Gavril I. Ninov, Losenetz Street 16, Sofia, Bulgaria, 1421; Ivan T. Penchev, K.Buckstone, M.Gortalov Street 12, Sofia, Bulgaria, 1618; Dimitar P. Valkov, K.Drushba, Bl.42-7, Sofia, Bulgaria, 1592

[21] Appl. No.: 53,793

[22] Filed: Apr. 27, 1993

[30] Foreign Application Priority Data

Apr. 28, 1992 [BG] Bulgaria .................... 96 274

[51] Int. Cl.⁵ .................. F16D 15/00; F02N 15/00
[52] U.S. Cl. .................. 192/45.1; 192/42; 74/7 C
[58] Field of Search .................. 74/6, 7 C; 192/41 A, 192/41.5, 42

[56] References Cited

U.S. PATENT DOCUMENTS

| | | |
|---|---|---|
| 2,951,570 | 9/1960 | Antrim, Jr. et al. ............. 74/7 C X |
| 4,792,028 | 12/1988 | Nishimura et al. ............. 192/45.1 X |
| 4,809,831 | 3/1989 | Kinoshita ............. 192/45.1 X |
| 4,960,189 | 10/1990 | Ogata et al. ............. 192/41 A |
| 5,000,303 | 3/1991 | Shoji et al. ............. 192/45.1 |

*Primary Examiner*—Allan D. Herrmann
*Assistant Examiner*—David W. Laub
*Attorney, Agent, or Firm*—Pennie & Edmonds

[57] ABSTRACT

A starter drive for use in machine-building and more specially in transport machine-building for starting internal combustion engines. The starter drive is with a simplified construction, increased reliability and loading capacity. The starter drive consists of plurality of wedging sprags (1), placed in rectangular unilaterally opened holes in an outer (2) and an inner (3) cages. Between the two rigid cages is disposed a smooth band cage (4). The cage (2, 3 and 4) together with the sprags (1) are disposed between the inner contact surface (5) with circular cross-section of the shaft (6) of the driving gear (7) and the outer contact surface (8) with circular cross-section, which is worked out in casing (9) of the starter drive.

11 Claims, 2 Drawing Sheets

STARTER DRIVE FOR INTERNAL COMBUSTION ENGINES

FIELD OF THE INVENTION

The invention relates to a starter drive for a one-way transmission of torque. More particularly, the invention is directed to a starter drive for engines, such as internal combustion engines, with applications in machine-building and especially in transport machine-building.

BACKGROUND OF THE INVENTION

A well known starter drive for internal combustion engines includes a plurality of wedging rollers each of which is disposed in a separate hole together with a resetting spring and an embraced supporting pin. Each hole is formed between outer and inner contact surfaces. The inner contact surface has circular cross-section and belongs to the starter driving gear shaft. The outer contact surface has complicated curve form and belongs to the starter drive casing (1).

A disadvantage of the known starter drive is the complicated construction, particularly of the outer contact surface, which elaboration requires complicated and expensive technological equipment. Moreover, the maximum torque (the loading capacity) of the device is limited by the contact radius of the rollers. The clutching of the rollers in one line of the outer contact surface leads to the fast wearing out of the contact areas which decreases the durability of the device. Furthermore, the construction excludes the opportunity to assemble starter drives with different clutching directions using the same details.

SUMMARY OF THE INVENTION

The object of the invention is the creation of a starter drive for internal combustion engines with simplified construction and increased reliability, loading capacity and durability.

The present invention provides a starter drive for internal combustion engines with a plurality of activated wedging sprags. disposed between two contact surfaces. The two contact surfaces belong respectively to the casing of the starter drive and the driving gear shaft. According to the invention the two contact surfaces have circular cross-section, and the sprags have non-circular cross-section. The sprags are placed in rectangular unilaterally opened holes on outer and inner rigid cages. The outer and inner rigid cages are formed as annular bodies with strengthening rims unilaterally disposed on the side, opposite to the holes.

Between the two rigid cages is disposed a smooth band cage.

In accordance with one embodiment of the invention the strengthening rims of the outer and inner cages are disposed unilaterally.

In accordance with another embodiment of the invention, the strengthening rims are disposed bilaterally.

In accordance with yet another embodiment of the invention, the outer and inner cages includes two symmetric parts.

The advantages of the starter drive according to the present invention are the simplified construction and easy manufacturing, providing increased reliability and loading capacity due to the fact that the rectangular holes of the rigid cages are unilaterally opened.

BRIEF DESCRIPTION OF THE DRAWINGS

The invention will now be described in detail by way of examples and with reference to the accompanying drawings, in which.

DESCRIPTION OF THE PREFERRED EMBODIMENT

Figure 1:
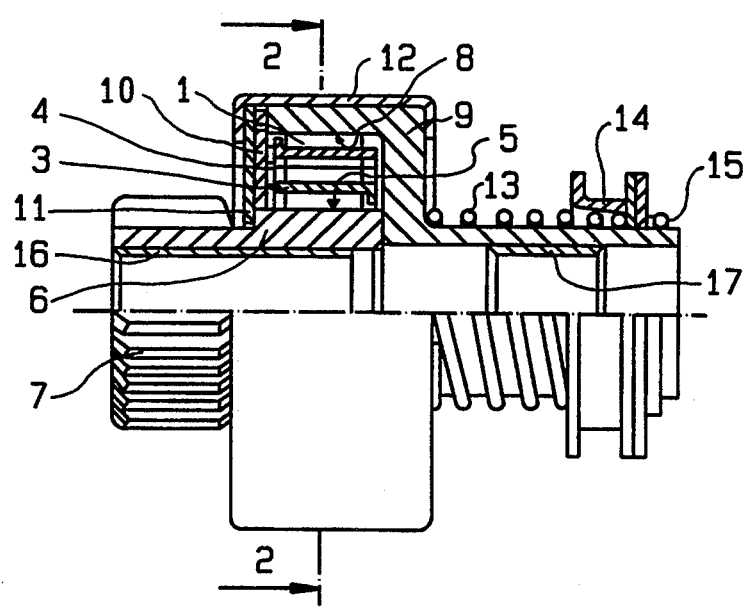
FIG. 1 is a partial longitudinal sectional view of a starter drive for an internal combustion engine.
Figure 2:
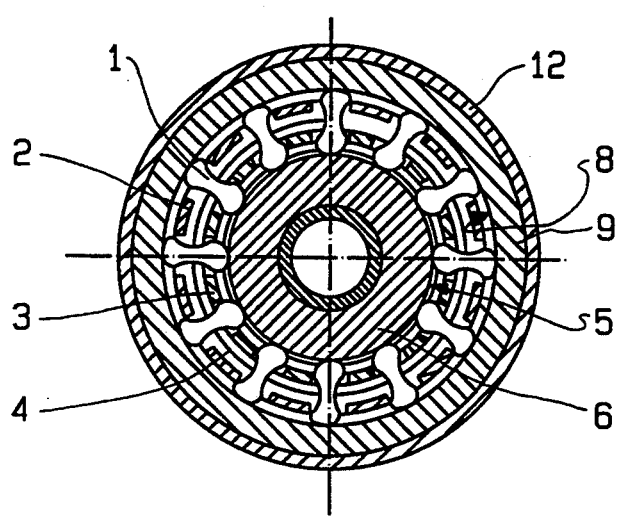
FIG. 2 is a cross-sectional view of a starter drive taken along the line 2—2 of FIG. 1.

The starter drive in accordance with the invention consists of a plurality of wedging sprags 1 (FIG. 1 and FIG. 2) with non-circular cross-sections, which are placed, in rectangular unilaterally opened holes in outer 2 and inner 3 rigid cages. Between the outer 2 and inner 3 rigid cages is disposed a smooth band resilient cage 4, which serves for resetting of the sprags 1. The cages 2, 3 and 4, together with the sprags 1, are placed between one inner contact surface 5 with circular cross-section, which belongs to the shaft 6 of the driving gear 7 of the starter drive, and one outer contact surface 8 with circular cross-section, formed in a casing 9 of the starter drive. A washer 10, a two-piece washer 11 and a rolled thinwall hub 12 serve to prevent the sprags 1 from axial displacement. On the casing 9 of the starter drive are mounted cylindrical helical spring 13, guiding member 14 and a stop-ring 15.

The casing 9 of the starter drive is mounted on the rotor shaft of the starter motor (not shown in the figs.), where hub 16 is a sliding-contact bearing during the rotating of the driving gear 7. To the guiding member 14 is mounted the electromagnet's fork of the starter motor (not shown). In the casing 9 of the starter drive are elaborated helical channels 17.

Figure 3:
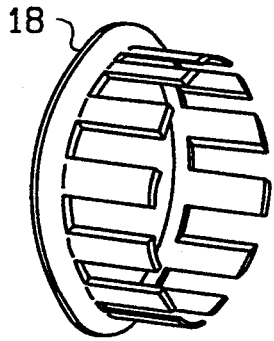
FIG. 3 is a perspective view of a rigid outer cage.
Figure 4:
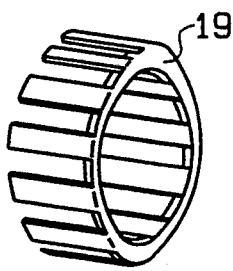
FIG. 4 is a perspective view of a rigid inner cage.

The outer 2 and inner 3 cages have strengthening rims 18 and 19 (FIG. 3 and FIG. 4).

Figure 5:
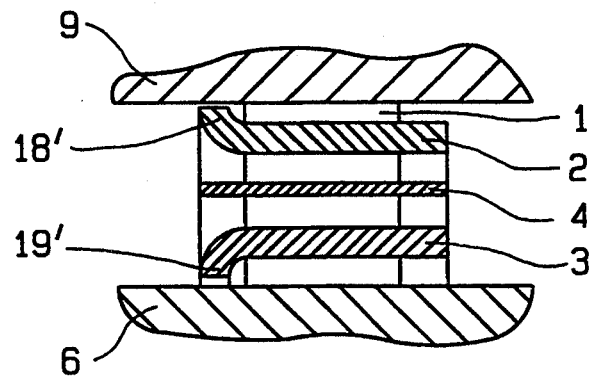
FIG. 5 is an enlarged view of a portion of the embodiment of the starter drive of FIG. 1 illustrating that strengthening rims of the outer and inner cages are unilaterally disposed with respect to the sprags.
Figure 6:
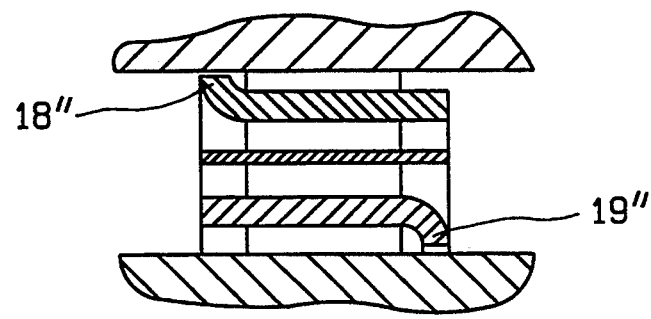
FIG. 6 shows an embodiment of the invention in which the strengthening rims of the outer and inner cages are bilaterally disposed with respect to the sprags.
Figure 7:
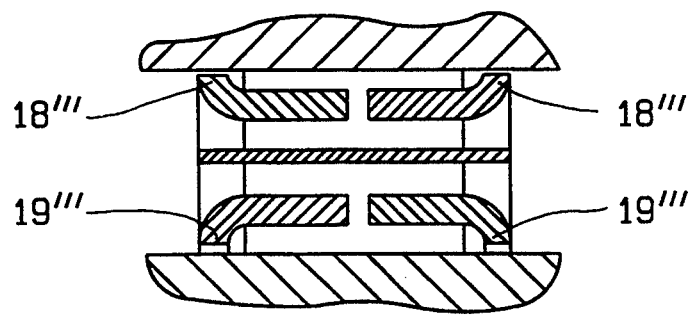
FIG. 7 shows an embodiment of the invention, where the outer and inner cages include two symmetrical parts.

In FIGS. 5–7 are shown different embodiments of the present invention, each corresponding to a different orientation of the strengthening rim 18 of outer cage 2 and strengthening rim 19 of inner cage 3 with respect to the sprags 1. In the embodiment shown in FIG. 5, rim 18' of the outer rigid cage 2 and rim 19' of the inner 3 cage are unilaterally disposed with respect to the sprags 1. In the embodiment shown in FIG. 6, rim 18" of the outer rigid cage 2 with rim 19" of the inner 3 cage are bilaterally disposed with respect to the sprags 1.

In the embodiment of the invention illustrated in FIG. 7, the composite outer cage is formed from two outer cages 2, the rims 18''' of which are bilaterally disposed with respect to the sprags. Similarly, the composite inner cage is formed from two inner cages 3, the rims 19''' of which are bilaterally disposed with respect to the sprags.

The operation of the starter drive is described as follows:

After applying voltage to the starter motor and to the electromagnet (not shown in the figs.), the casing of the starter drive turns due to the helical channels 17 and is displaced axially by the electromagnet's fork until the driving gear 7 clutches to the flywheel of the internal combustion engine. The torque of the starter motor transmits from the casing 9 of the starter drive through wedged sprags 1 to the driving gear 7, which drives the internal combustion engine until ignition occurs. After ignition, the speed of rotation of the flywheel increases rapidly, which causes the speed of rotation of gear 7 to increase since it is clutched to the flywheel. In that moment the sprags 1 due to their particular shape, escape from clutching with the contact surfaces 5 and 8, preventing that way the starter motor from damages.

After disconnecting the power supply of the starter motor, the starter drive turns back to its initial position.

What is claimed is:

1. A one-way clutch assembly comprising:
   a plurality of hedging sprags having a predetermined shape and mounted circumferentially in an annular space between an inner ring and an outer ring, said rings having contact surfaces of circular cross-section;
   an activating smooth band cage having a plurality of openings formed thereon, the sprags being inserted in said openings; and
   at least one outer cage and at least one inner cage, each cage having a rigid annular body, a strengthening rim disposed on one end of the body and a plurality of rectangular apertures opening toward the other end of the body; wherein the sprags are placed in the apertures for retaining said plurality of sprags in position.

2. The clutch assembly as in claim 1, wherein the strengthening rims of the outer and inner cages are unilaterally disposed with respect to the sprags.

3. The clutch assembly as in claim 1, wherein the strengthening rims of the outer and inner cages are bilaterally disposed with respect to the sprags.

4. The clutch assembly as in claim 1, comprising two pairs of outer and inner cages, wherein the strengthening rims of the two outer cages are bilaterally disposed with respect to the sprags so as to form a composite outer separator, and the strengthening rims of the two inner cages are bilaterally disposed with respect to the sprags so as to form a composite inner separator.

5. The clutch assembly as in claim 1 wherein the strengthening rim of each outer cage protrudes in a direction outward from the body of the cage and the strengthening rim of each inner cage protrudes in a direction inward from the body of the cage.

6. A starter drive for one-way transmission of torque comprising:
   a casing having a profiled bore, said bore defining an inner contact surface of circular cross-section;
   a driving gear shaft having one end configured to fit into said profiled bore, said end defining an outer contact surface of circular cross-section;
   a plurality of sprags mounted circumferentially in an annular space between said inner and said outer contact surfaces; and
   at least one outer cage and at least one inner cage, each cage having a rigid annular body, a strengthening rim disposed on one end of the body and a plurality of rectangular apertures opening toward the other end of the body; wherein the sprags are placed in the apertures for retaining said plurality of sprags in position.

7. The starter drive as in claim 6 wherein the strengthening rims of the outer and inner cages are unilaterally disposed with respect to the sprags.

8. The starter drive as in claim 6 wherein the strengthening rims of the outer and inner cages are bilaterally disposed with respect to the sprags.

9. The starter drive as in claim 6 comprising two pairs of outer and inner cages, wherein the strengthening rims of the two outer cages are bilaterally disposed with respect to the sprags so as to form a composite outer separator, and the strengthening rims of the two inner cages are bilaterally disposed with respect to the sprags so as to form a composite inner separator.

10. The starter drive as in claim 6 further comprising an activating smooth band cage having a plurality of openings formed thereon, the sprags being inserted in said openings.

11. The starter device as in claim 6 wherein the strengthening rim of each other cage protrudes in a direction outward from the body of the cage and the strengthening rim of each inner cage protrudes in a direction inward from the body of the cage.

* * * * *